United States Patent [19]

Muzzarelli

[11] Patent Number: 4,645,680
[45] Date of Patent: Feb. 24, 1987

[54] METHOD FOR CHEESE COMPACTING

[76] Inventor: Gabriele Muzzarelli, via Marzabotto 116-41100, Modena, Italy

[21] Appl. No.: 781,415

[22] Filed: Sep. 30, 1985

Related U.S. Application Data

[62] Division of Ser. No. 636,024, Jul. 30, 1984, Pat. No. 4,576,091.

[30] Foreign Application Priority Data

Aug. 5, 1983 [IT] Italy .................. 22438A/83

[51] Int. Cl.$^4$ ............................................. A23C 19/00
[52] U.S. Cl. .................................... 426/582; 426/512
[58] Field of Search ............... 426/36, 491, 478, 512, 426/582; 99/452, 453–455, 456–460, 465

[56] References Cited

U.S. PATENT DOCUMENTS

| 3,500,542 | 3/1970 | Roiner | 99/458 |
| 4,222,321 | 9/1980 | Muzzarelli | 99/458 |
| 4,393,759 | 7/1983 | Quilliou | 99/459 |

Primary Examiner—George Yeung
Attorney, Agent, or Firm—Steinberg & Raskin

[57] ABSTRACT

The compacting apparatus for whole cheeses comprises at least a tank containing cooling water, an inertial table carrying the whole cheeses from one end to the other end of said tank, and a balancing blade receiving the whole cheeses supplied from the table and unloading such whole cheeses from said tank.

5 Claims, 6 Drawing Figures

METHOD FOR CHEESE COMPACTING

This is a division of application Ser. No. 636,024, filed 7/30/84, now U.S. Pat. No. 4,576,091.

BACKGROUND OF THE INVENTION

This invention relates to an apparatus for water compacting of hot whole cheeses, particularly those of so-called spun paste such as, for example, "mozzarellas".

In dairy industries, the hot whole spun cheeses as obtained, for example, from the forming machine or from the spunning and forming machine, are compacted by contact with cooler water, which may be at the temperature of the water system, or even lower if suitably cooled.

The compacting process is carried out in apparatuses of two types. Namely, one type of apparatus comprises a simple tank, in which water is circulated and into which the whole cheeses are introduced by manual operation and then still manually removed at the end of compacting process. The drawbacks of this type of apparatus are just those of batch processes, with the addition of the heaviness of loading and unloading work imposed on the workers.

The second type of apparatus comprises a tank having arranged therein a continuous conveyor on which such whole cheeses travel in countercurrent to the cooling water.

The most apparent drawbacks of this type of apparatus are the comparatively substantial vertical overall size of the continuous conveyor requiring a tank water level which is higher than that strictly necessary, with resulting larger dimensioning of the tank and other carrying parts, and necessity of driving the conveyor by shafts passing through the tank walls on sealed bearings of difficult and inconvenient manufacture.

SUMMARY OF THE INVENTION

It is the object of the present invention to provide a solid type of compacting apparatus, of ready manufacture, efficient, and of simple and easy maintenance. According to the invention, such an apparatus is essentially characterized in that the conveyor arranged in the tank is an inertial type of conveyor and the cheese unloading from the tank occurs by a controlled bascule element.

BRIEF DESCRIPTION OF THE DRAWINGS

The invention can be more clearly understood from the following detailed description, given by mere way of example and in connection with the accompanying drawings, in which.

DETAILED DESCRIPTION OF THE PREFERRED EMBODIMENTS

Figure 1:
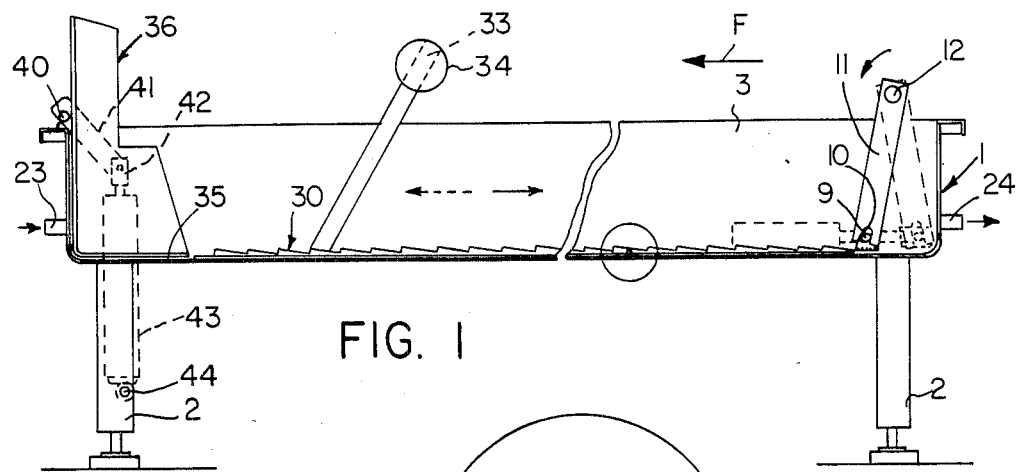
FIG. 1 is a schematic longitudinal sectional view of the apparatus according to the invention.

Referring to the figures of the accompanying drawings, reference numeral 1 denotes a rectangular tank, for example of stainless steel, having its bottom slightly convergent to the central portion where a valve fitted outlet is provided (not shown). The tank is mounted on any conventional load bearing framework, of which the supporting legs 2 are shown. The longitudinal walls 3 of the tank have at some reduced height from the bottom, guiding structural shapes 4, secured in any known manner to said walls and made of plastics material of low friction coefficient, resistant to wear and associated with metal. These guide elements hve slidably mounted therein the side edges of elements 5, made of stainless steel sheets, having a transverse profile formed by a plurality of saw teeth.

Figure 3:
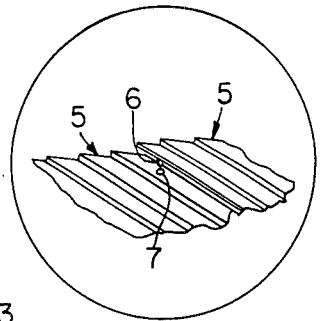
FIG. 3 is a fragmentary perspective view of the encircled area III in FIG. 1 showing one possible coupling mode between the various elements or modules comprising the inertial conveyor.
Figure 4:
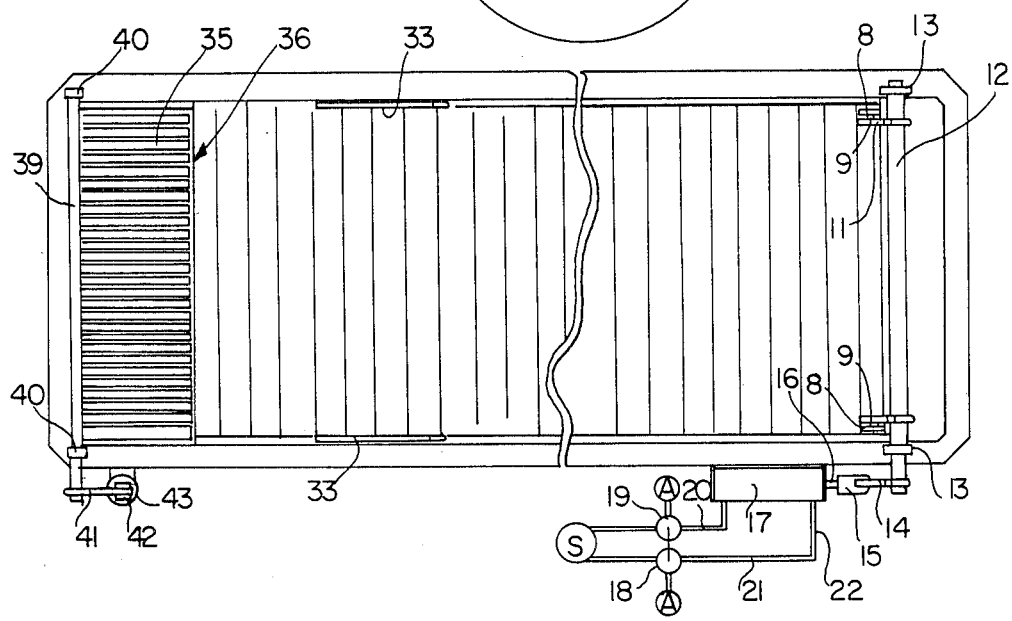
FIG. 4 is a plan view of the apparatus.

Said elements 5 are removably interconnected, as shown in FIG. 3, particularly provided with at one end thereof two or more downwardly facing pins 6, and at the other end, with the same number of correspondingly arranged holes 7, in which said pins will be inserted. Of course, it is within the scope of the invention that the use of only one element, or different means for removable coupling of the various elements to one another may be provided.

The elements, as coupled and arranged in said guides, make up an inertial table on which the whole cheeses are laid. The first element of the table, that is the element nearest the loading location for the hot whole cheeses and which is at the right end of FIG. 1, has at its end two vertical lugs 8 provided with transverse or horizontal pins 9. Each of such pins extend within a longitudinal slot 10 of an arm 11. The two arms 11 are integral with a shaft 12, which is rotatably carried by supports 13 integral with the tank 1 or framework supporting the latter. A lever 14 is integral with a projecting end of said shaft 12 and provided at the bottom with a longitudinal slot in which transversely extends a pin mounted between the arms of a fork 15, the latter being integral with the stem or rod of a double-acting cylinder 17. The cylinder is horizontally arranged and is secured to the tank or supporting framework.

The two chambers of varying volume, in which the piston divides said cylinder 17, are alternately connectable by lines 20, 21 with a compressed air supply S or with the atmosphere A through the electromagnetic three-way valves 18, 19, which are interlocked, so that when one valve communicates with the atmosphere, the other communicated with said compressed air supply S and vice versa. An adjustable reducing valve 22 is placed in line 21, so that the piston will move in the two directions at different speeds, and particularly at a lower speed when said line 21 is connected with supply S. Owing to the described mechanical connection, this means that the inertial table (formed of the assembly of elements 5) moves to and fro along the guides and such a movement is slow in the direction of arrow F and fast in the opposite direction. During the slow movement the whole cheeses advance with the table, on which they bear, in the direction of arrow F, while owing to the rapid movement in the opposite direction of the table said whole cheeses remain substantially still (by inertia) at the position taken with said slow movement. Substantially, the movement of the whole cheeses is characterized by steps of advancement for a predetermined length alternated by dwelling steps.

Figure 2:
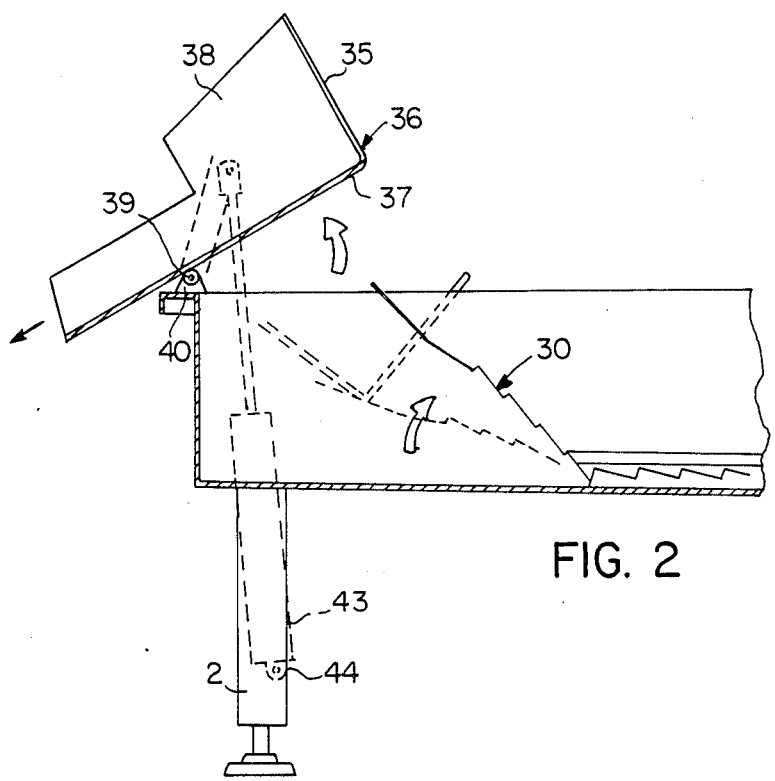
FIG. 2 is a similar view showing one end of the apparatus when whole cheeses are being unloaded.

The hot whole cheeses are manually or by any known supply means introduced at the right end (as seen in FIGS. 1 and 2) of the apparatus, compacted by contact with cold water moving in countercurrent, that is in opposite direction to arrow F, and are removed at the other end.

Reference numerals 23 and 24 respectively denote the inlet and outlet pipe unions for the cooling water.

The saw tooth pattern of the table is provided in order to ensure the whole cheese advancement notwithstanding the countercurrent water circulation. Thus, the whole cheeses will bear against the steepest corners or edges of the saw teeth.

Figure 5:
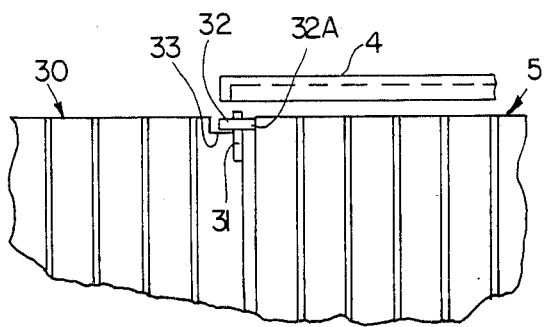
FIG. 5 is a fragmentary plan view of the inertial conveyor.

In order to remove the compacted whole cheeses from the tank, a device is provided on the left side of latter and comprises (particularly see FIGS. 2 and 5) a short length of saw tooth sheet 30 which is a continuation of the inertial table (formed of said elements 5) forming part of the movements of the latter. This end length 30 has coaxial pins 31 at one end, which are arranged in corresponding holes 32 of side tabs or fins 32A projecting from the last of said elements 5. Therefore, this end length can rotate about the axis of such pins. Two heavy metal bars 33 are connected on the sides to said end length 30 adjacent said pins 31, which bars are provided with additional weights 34 and tend to rotate the end length to the position of FIG. 2, at which said bars will bear either on stops, or the guides, or inertial table.

Except that during unloading operations, to be discussed in the following said end length 30 is maintained at a horizontal attitude, that is in alignment with the inertial table, by the slotted lower side 35 of a blade 36 making up the basic portion of the device removing the compacted whole cheeses from the tank. The blade is made to occupy the end portion of the tank, to which it may be considered as conjugated and has a back wall 37, which could also be slotted or perforated and two side frames 38. Said back wall is integral with a horizontal axis 39, which is rotatably mounted on bearings 40 integral with the tank or supporting framework thereof. One projecting end of the axis of shaft 39 has secured thereto a crank 41 pivoted to the stem 42 of a pneumatic double-acting jack 43, the cylinder of which is pivoted at 44 to one of the uprights 2 of the tank.

The operation is as follows.

The inertial table is operating. Cooling water circulates within the tank from inlet 23 to outlet 24. Manually or by a feeder, the operator places the hot whole cheeses on the inertial table at the left side of the apparatus. The blade 36 and end length 30 are at the position shown in FIG. 1. Owing to the alternative rhythmical movements at different speeds, the whole cheeses move leftward. The most advanced whole cheeses arrive at and move on the bottom wall 35 of said blade 36. Then, the operator operates said jack 43, so that the blade rotates to the position of FIG. 2 and by gravity unloads the compacted whole cheeses from the tank, while owing to the blade permeability the water falls down into the tank. During the blade rotation, the end length 30 rotates in opposite direction and for some length of its path adheres to said blade (see FIG. 2). The blade leaves said length 30 when the latter has reached its position of end of stroke. The rotation of length 30 performs the function of preventing further whole cheeses from arriving at the zone of said blade 36.

Upon unloading of the compacted whole cheeses, the jack 43 is operated in reverse direction, so as to move the blade back to the position of FIG. 1. During this movement, the blade interferes with the end length 30 and also causes the latter to move back to the position of FIG. 1, where the end of such a length is confined under the blade wall 35. Under these conditions, the whole cheeses can move along said length 30 and move back in the blade 36.

Figure 6:
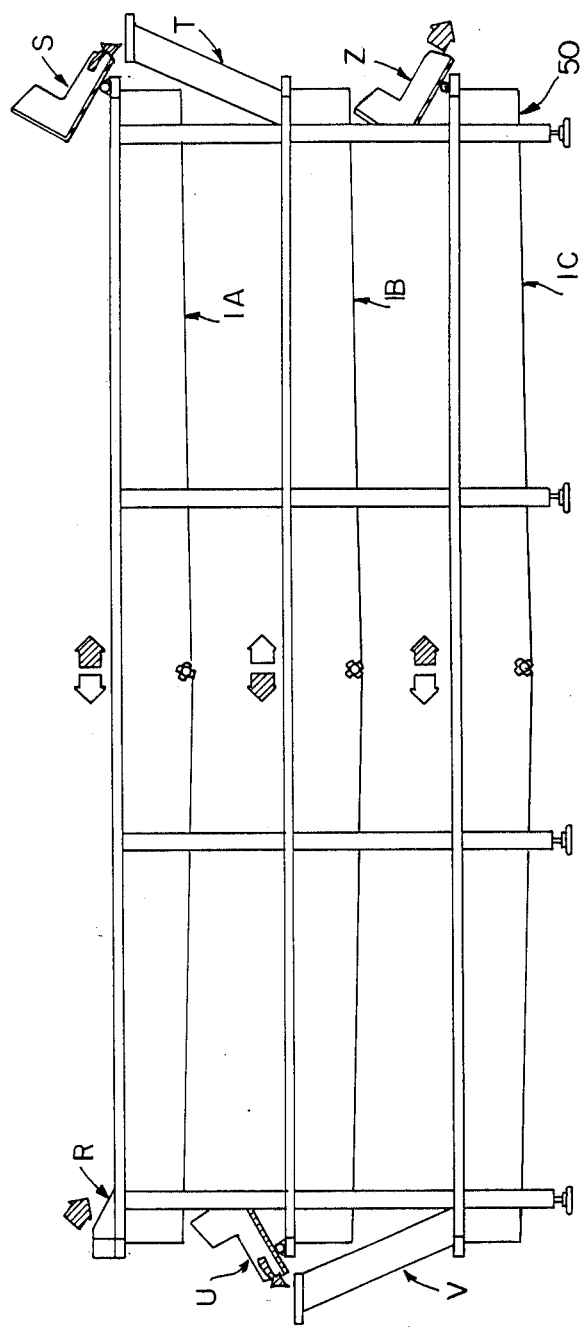
FIG. 6 is a side elevational view of an apparatus having three superimposed tanks.

FIG. 6 schematically shows a solution comprising three tanks 1A, B, C superimposed to one another and carried by a metal framework 50. The hot whole cheeses to be compacted are loaded by a chute at one end of the upper tank 1A at R. Sail whole cheeses fall down on the inertial table in the tank and made as previously described. At the tank end said blade S provides by means of chute T for transferring the partially compacted whole cheeses to the underlying tank 1B. The whole cheeses are transferred to the other end of this tank by means of an inertial table and therefrom transferred to the lower tank 1C by the usual blade U and a chute V. The inertial table of tank 1C carries the whole cheeses to the final unloading blade Z.

The reduced height of the inertial table and hence of the containing tank allows to provision of such structures as that of FIG. 6, occupying a reduced horizontal space, which is particularly advantageous in dairies where the horizontal surfaces are particularly important.

The stroke C of the table is advantageously selected to be ½ of the length of a saw tooth.

What I claim is:

1. Method for compacting whole cheese, comprising the steps of
    disposing the cheese upon a conveyor,
    reciprocatingly moving the conveyor in first and second directions,
    moving the cheese in the first direction by the conveyor moving in the first direction,
    maintaining the cheese substantially in position under its own inertia when the conveyor moves in the second direction,
    conveying the cheese onto a bascule element,
    rotating the bascule element about an axis to remove the cheese away from the conveyor, and
    introducing a stream of water against the cheese moving along the conveyor in a direction substantially opposite to the direction of movement of the cheese along the conveyor, whereby the cheese is compacted by contact with the stream of water.

2. The method of claim 1, wherein the cheese is moved along the conveyor in the first direction and substantially maintained in position when the conveyor moves in the second direction, by
    moving the conveyor at a slower speed in the first direction than in the second direction.

3. The method of claim 1, comprising the additional step of
    rotating an end portion of the conveyor in a direction opposite the direction of rotation of the bascule element when the same is rotated,
    whereby further movement of cheese along the conveyor is prevented.

4. The method of claim 2, comprising the additional steps of
    transferring the cheese to a second reciprocating conveyor,
    moving the cheese along the second conveyor by moving the second conveyor at a slower speed in a first direction than in a second direction, conveying the cheese onto a second bascule element off the second conveyor, rotating the second bascule element about an axis to move the cheese away from the second conveyor, transferring the cheese onto a third reciprocating conveyor, moving the cheese along the third conveyor by moving the third conveyor at a slower speed in a direction than in a second direction, conveying the cheese onto a third bascule element off the third conveyor, and rotating the third bascule element about an axis to remove the cheese away from the third conveyor.

5. The method of claim 1, wherein the cheese is moved substantially horizontally along the conveyor.

* * * * *